United States Patent [19]

Hayes

[11] Patent Number: 4,787,613
[45] Date of Patent: Nov. 29, 1988

[54] CAMERA REPAIR AND SUPPORT DEVICE

[76] Inventor: Michael Hayes, 21808 Craggy View, Chatsworth, Calif. 91311

[21] Appl. No.: 39,119

[22] Filed: Apr. 13, 1987

[51] Int. Cl.$^4$ .............................................. B25B 1/22
[52] U.S. Cl. ........................................ 269/75; 269/72; 269/97
[58] Field of Search ...................... 269/71, 72, 74, 75, 269/95, 45, 97

[56] References Cited

U.S. PATENT DOCUMENTS

| | | | |
|---|---|---|---|
| 687,183 | 11/1901 | Kolander | 269/75 |
| 2,669,958 | 2/1954 | Sweeney | 269/75 |
| 4,039,178 | 8/1977 | Odames | 269/75 |
| 4,214,739 | 7/1980 | Dailey | 269/75 |

*Primary Examiner*—Frederick R. Schmidt
*Assistant Examiner*—Judy J. Hartman
*Attorney, Agent, or Firm*—Rapkin, Gitlin, Moses & Schwartz

[57] ABSTRACT

The present invention in its preferred embodiment comprises a camera repair and support device having a conventional clamp which is adaptable to be secured to any appropriate surface, such as a work table or any suitable horizontal or vertical surface. Integrally formed with the clamp is a first member that is usually tubular in design and extends out from the surface of one end of the clamp and even further by its telescoping feature. Fixed to one end of the first member is a second columnar shaped member that is rotatably connected to the first member and adapted to swivel 360° relative to the first member about the horizontal axis that lays between the two members. A third member is connected to the second member by a ball and socket joint which allows the third member to rotate 360° relative to the second member about the horizontal axis that lays between the two. A locking bolt is inserted into the side wall of the second member. A turn of the knob affixed to one end of the bolt in the clockwise direction will lock the second and third members firmly in place. Angular displacement of the third member relative to the second member is achieved by directing the third member vertically downward into the slot formed within the sidewall of the second member.

1 Claim, 2 Drawing Sheets

CAMERA REPAIR AND SUPPORT DEVICE

BACKGROUND OF THE INVENTION

1. Field of the Invention

The present invention relates generally to the field of camera repair and photography and more particularly to a portable device that is suitable for use as a means to mount and manipulate the positions of a camera during the repair process and as a means to mount a camera in a fixed position in lieu of utilizing a conventional tripod.

2. Description of the Prior Art

Devices which support cameras while they are in the process of being examined or repaired are known in the prior art. However, such devices are often inadequate to serve the objectives sought by the repair technician. For example, existing devices are typically complex in their design, too weak in their construction to support the heavier and more cumbersome video cameras and often are without the necessary features that allow the camera to be elevated, rotated and tilted in all directions to facilitate the examination and repair process. The present invention solves the many problems and drawbacks associated with the prior art devices. It provides a lightweight and portable device that is structurally much stronger than the devices of the prior art and supports all types of cameras, including the conventional 35 mm variety used for still photography, movie cameras and video cameras. It provides the further advantage of employing a wide range of versatility in that the device permits the technician access to all the external regions of the camera and virtually all areas that contain the camera's internal components in order to properly examine, repair and test the camera. The unique structure of the device permits the camera to be elevated, rotated and tilted in almost any direction and locked into the desired position simply with the turn of a single knob. These same features also serve to provide the photography enthusiast with the means to stabilize and manipulate the camera during a picture taking session and, in essence, provide a more desirable option to the conventional tripod apparatus.

The advantages and distinctions of the present invention over the prior art will become clearly evident in the following disclosure.

SUMMARY OF THE INVENTION

The present invention in its preferred embodiment comprises a camera repair and support device having a conventional clamp which is adaptable to be secured to any appropriate surface, such as a work table or any suitable horizontal or vertical surface. Integrally formed with the clamp is a first member that is usually tubular in design and extends out from the surface of one end of the clamp and even further by means of its telescoping feature. Fixed to one end of the first member is a second columnar shaped member that is rotatably connected to the first member and adapted to swivel 360° relative to the first member about the horizontal axis that lays between the two members. A third member is connected to the second member by a ball and socket joint which allows the third member to rotate 360° relative to the second member about the horizontal axis that lays between the two. A locking bolt is inserted into the side wall of the second member. A turn of the knob affixed to one end of the bolt in the clockwise direction will lock the second and third members firmly in place. Angular displacement of the third member relative to the second member is achieved by directing the third member vertically downward into the slot formed within the sidewall of the second member.

The primary object of the present invention is to provide a device that is capable of supporting video cameras and those designed for still photography and enabling the camera in the supported state to be tilted, elevated and rotated to any desired position or height to permit the technician direct and easy access to the camera's external and internal components for the purpose of examination and repair.

Another object of the present invention is to provide a device that is portable and simple in design.

Another object of the present invention is to provide a device that is convenient to use and inexpensive to manufacture.

Still another object of the present invention is to provide a device that utilizes a single means to simultaneously lock certain of its components from rotating and undergoing angular displacement about their respective axes.

Still another object of the present invention is to provide a device that will support and manipulate a camera during a picture taking session and yet is less cumbersome and more maneuverable than a tripod.

Other objects and advantages will become apparent in the following specifications when considered in light of the attached drawings wherein a preferred embodiment of the invention is illustrated.

DETAILED DESCRIPTION OF THE PREFERRED EMBODIMENT

Figure 1:
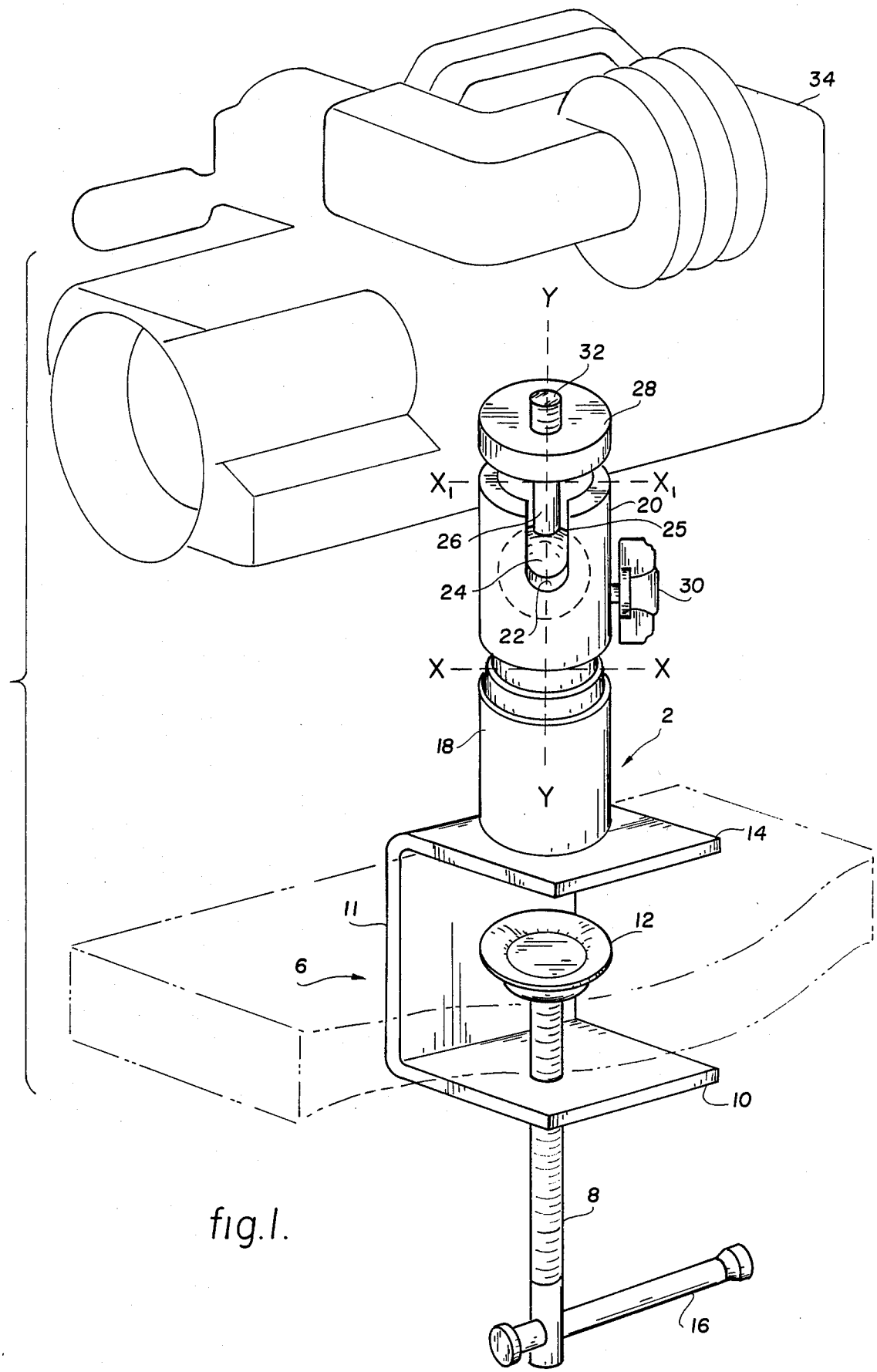
FIG. 1 is a perspective view of the device of the present invention.
Figure 2:
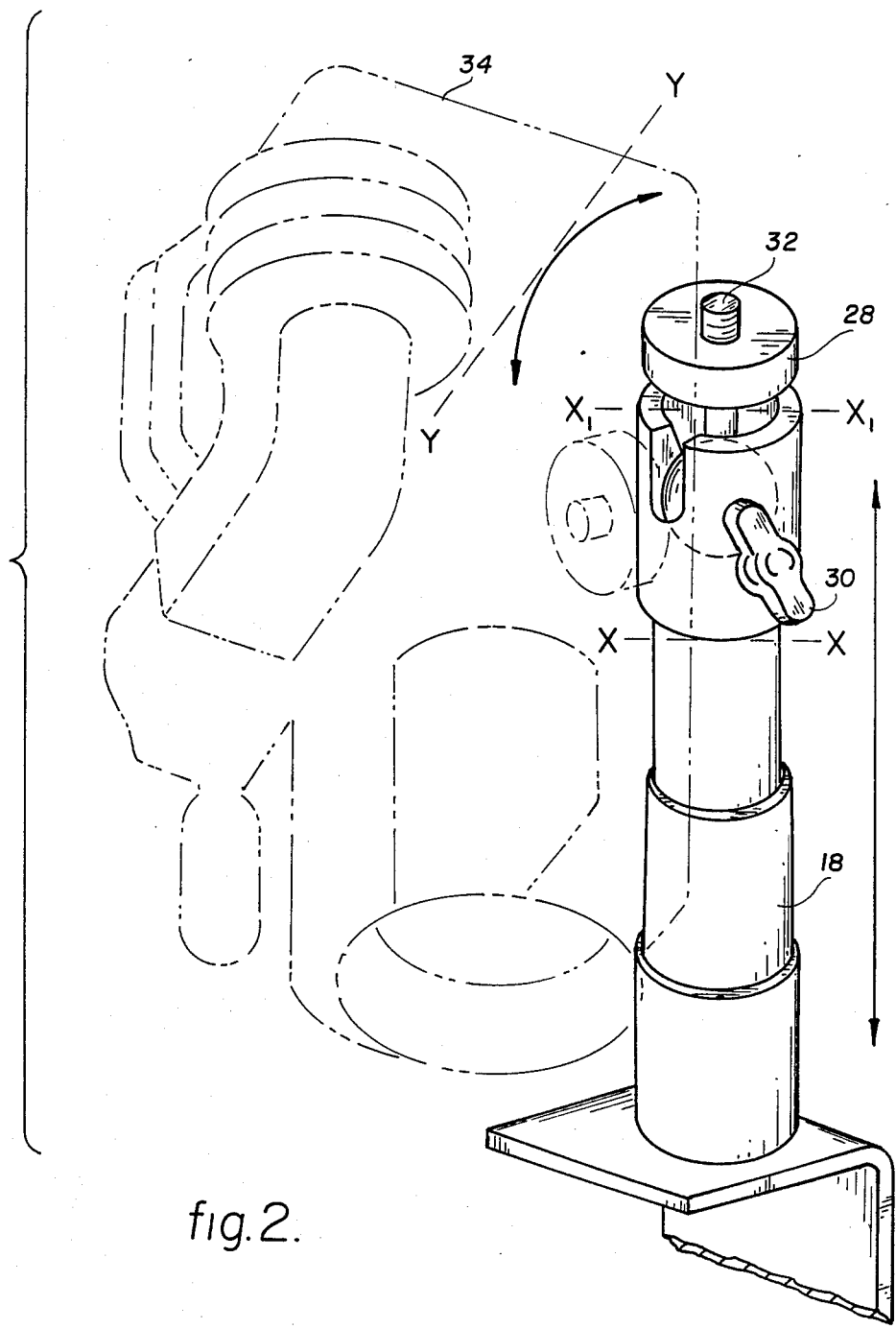
FIG. 2 is a perspective view of the device of the present invention illustrating the mounted camera in a 90° angular displacement along axis Y—Y.

Referring now in greater detail to the portable camera repair and support device of the present invention, and with particular reference to the embodiment illustrated in the drawings, clamp 6 may be constructed of any conventional material suitable for a device of this type, such as a metal alloy or fiberglass casting. Clamp 6, which serves as a means for tightly affixing the present invention to any suitable surface, such as a work table, work bench, or the like, is comprised of several component parts, including a U-shaped frame comprising lower arm 10, upper arm 14, which are spaced apart and positioned parallel to each other, and a member 11 that connects the two. A bolt 8 is threaded through the lower arm 10 and includes a rotatable cap 12 affixed to one of its ends. Rotatable cap 12 is adapted to engage the surface of a work table or the like and cooperate with upper arm 14 to secure clamp 6 firmly to the table surface. Rotatable cap 12 may also be designed to incorporate a pair of opposing notched out sections along its outer skirt to enable the cap to securely engage a rounded surface, such as a section of pipe. Inserted through a hole located at the opposite or lower end of bolt 8 is lever 16, which serves as the means for turning bolt 8 in either a clockwise or counterclockwise direction to respectively tighten or loosen the grip of clamp 6. Affixed to the top surface of upper arm 14 is a first shaft 18 which is adapted to telescope out within a prescribed range of distance. Connected to the opposite end of first shaft 18 is a second shaft 20 which is capable of rotating 360 degrees abaouot the axis X—X. Second shaft 20 may be locked firmly into place and restrained from rotation about axis X—X by turning knob 30 in a clockwise direction. By reversing the direction of knob 30, second shaft 20 may again be allowed to rotate about that same axis. Formed within the sidewall of second shaft 20 and having a length of approximately one-half the length of shaft 20 is a U-shaped channel 22. Seated inside a hollowed out section formed within the interior of the upper portion of shaft 20 is a ball and socket joint 24, including a rotatable ball 25 and a bolt 26 having a threaded end 32. Threaded end 32 is caused to penetrate the central portion of support member 28 to which the bottom of a camera may be mounted and firmly secured. Support member 28 is adapted to ball and socket joint 24 to allow it to rotate 360° about axis $X_1$—$X_1$. Support member 28 is also rotatable along axis Y—Y as shown in FIG. 2 wherein bolt 26 is rotated vertically downward and received within channel 22. Support member 28 may be locked firmly in place at any point along either axis $X_1$—$X_1$ or Y—Y by turning knob 30 in a clockwise direction. Support member 28 may again be allowed to rotate freely about these axes by turning knob 30 in a counterclockwise direction.

The device of the present invention is not only useful as an efficient and practical means for examining and repairing cameras, particularly the usually heavier and more cumbersome video kind, but may also be used in place of themore conventional tripod to secure virtually any type of camera from undesirable movements during a picture taking session. Its versatility also allows it to maneuver the camera in almost any direction.

In practice, clamp 6 is mounted to any suitable surface, such as a work table, work bench or the like, and secured in place by turning lever 16 in a clockwise direction to rotate bolt 8 until the surface is tightly secured between upper arm 14 and rotatable cap 12.

To mount a camera to the device of the present invention, such as the video camera indicated in the drawings by numeral 34, threaded end 32 is inserted into threaded receptacle (not shown) formed within the bottom surface of camera 34. Support member 28 is then rotated in a clockwise direction until it becomes tightly secured to the bottom of camera 34. Depending upon the exact nature of the examination to be conducted or the repair work to be performed, first shaft 18 may be extended in a telescopic fashion within a prescribed range of distance to bring the camera to eye level with the technician and permit access to virtually any area of the camera or its internal components. Camera 34 may also be rotated or permitted to pan 360 degrees about axes X—X or $X_1$—$X_1$ and manipulated vertically along axis Y—Y as shown in FIG. 2.

Another embodiment of the present invention includes separate locking knobs which may be adapted to independently lock the rotations of second shaft 20 about axis X—X and support member 28 about axis $X_1$—$X_1$, respectively. With the addition of this feature, a camera can be rotated or caused to pan about axis X—X while at the same instant support member 28 can be securely locked in place to avoid unpredictable angular movements along axis Y—Y that can sometimes occur with a larger, heavier or more cumbersome camera.

While the invention will be described in connection with a certain preferred embodiment it is to be understood that it is not intended to limit the invention to that particular embodiment. Rather, it is intended to cover all alternatives, modifications and equivalents as may be included within the spirit and scope of the invention as defined by the appended claims.

I claim:

1. A portable device suitable for use in repairing and supporting cameras, comprising:
   a. a gripping member adapted to be secured to a fixed surface;
   b. a longitudinally adjustable telescoping first member, said first member being fixedly secured at its bottom end to the top section of said gripping member and including a plurality of cooperating rigid sleeve members adapted to slidably expand and retract along the longitudinal axis of said first member and means to fix said sleeve members in place along said axis consisting of the incremental engagement of the outer wall of one or more of said sleeve members with the respective inner wall of said sleeve member next in succession along said access;
   c. a second member rotatably connected to said first member and adapted to swivel 360 degrees relative thereto about a first axis;
   d. a third member connected to said second member by a ball and socket joint that includes a rod member secured to and extending between said ball and said third member, said joint allowing said third member to swivel relative to said second member about a second axis and permitting angular displacement of said second axis relative to said first axis along a third axis located between a position that is parallel with said first axis and a position that is perpendicular thereto;
   e. a means formed within said second member to receive said rod member when the angular displacement of said second axis is generally normal to said first axis; and,
   f. a means adapted to simultaneously lock said second and third members from rotating about said first, second and third axes, respectively.

* * * * *